United States Patent Office 3,366,014
Patented Jan. 30, 1968

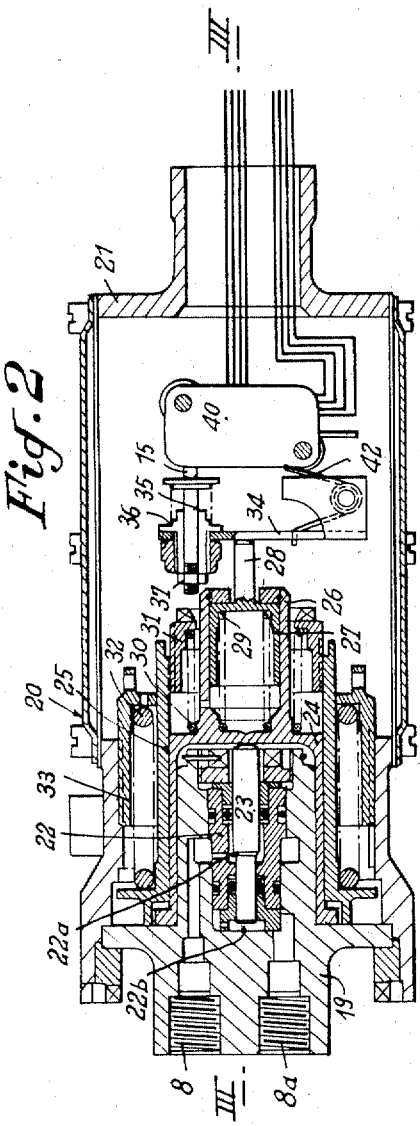

1

3,366,014
CONTROL DEVICE FOR TWO HYDRAULIC POWER DEVICES WHICH ARE ADAPTED FOR BEING COUPLED IN PARALLEL
René Lucien, Neuilly-sur-Seine, France, assignor to Recherches Etudes Production R.E.P., Paris, Hauts-de-Seine, France, a corporation of France
Filed Jan. 18, 1965, Ser. No. 426,075
Claims priority, application France, Dec. 9, 1964, 998,026, Patent 1,425,480
8 Claims. (Cl. 91—152)

The invention is directed to control apparatus for a plurality of hydraulic power devices which deliver power to a common receiver.

A common arrangement is one in which two hydraulic power devices, for example two hydraulic motors are coupled in parallel to a single receiver, for example to the same line shaft for driving two turbines or two machine tools working in an asymmetric or symmetrical manner. Such a motor arrangement is used to drive aircraft wing flaps.

Hydraulic motors of this kind are generally connected to a detector of asymmetry of the driving torques, which cuts off the supply to the two motors as soon as any substantial asymmetry of the the torques appears, in order to prevent damage to the receiver, for example to the shaft.

This single safety device is however not sufficient to ensure proper operation of the system. In fact, on the one hand the asymmetry detector must only come into action when the sum of the driving torques is greater than a predetermined value. During the starting up of the motors for example, it should not cause an untimely interruption of their supply and this condition should hold as long as the sum of the driving torques does not reach a substantial value. This is especially the case in the application of such a system to the pivotal drive of aircraft flaps.

Furthermore, even when the driving torques are symmetrical, the supply to the two motors must be interrupted when the sum of their torques reaches a high value, greater than the preceding threshold, so as to avoid damage to certain mechanical parts.

The invention has for an object to provide a device adapted to control, under the conditions above-mentioned, the sum of the driving torques of two hydraulic motors coupled in parallel to the same receiver, for example to the same line shaft.

According to the invention the control device comprises a device sensitive to pressure and two systems of electric switches controlled by the latter said device, one of these systems being actuated when the sum of the pressures applied to the pressure-sensitive device is greater than or equal to a first preadjustable threshold, and the other system being actuated when the sum of the pressures applied on the said device reaches a second preadjustable threshold, higher than the first, the pressure-sensitive device and the switch systems being provided with restoring members in order to return to respective initial positions when the sum of the pressures applied to the pressure-sensitive device again becomes less than the critical threshold.

In order to control the supply of fluid to two hydraulic motors coupled in parallel to a single line shaft, the pressure-sensitive device is put into communication with each of the supply circuits of the motors; through the intermediary of the first system of switches, an electric control of the switch gear of the motors is connected to a detector of torque asymmetry; and through the intermediary of the second system of switches, the same control or another is connected to a source of electrical energy adapted to actuate this control. The variations of the supply pressures of the motors faithfully follow the variations of the driving torques, and the control device is thus capable

2 of controlling the supply as a function of the sum of the torques of the two motors.

In order to ensure two-fold safety, each of the electric switch systems preferably comprises two switches actuated simultaneously by the pressure-sensitive device when the sum of the pressures reaches the corresponding threshold, each of these two switches controlling independently the electric drive to which they are connected.

The supply equipment of each hydraulic motor may comprise for example an electro-distributor controlled by a relay connected to the electric switch systems, namely two relays and two electro-distributors in all. In the case where each system of switches comprises two switches, each of the switches of one system can be connected respectively to one of the relays, each relay being also capable of controlling simultaneously the two electro-distributors so as to increase still further the safety of operation of the whole system.

A form of utilization of the control device in accordance with the invention, and a form of construction of the said control device will be described below by way of example only and without any implied limitation, reference being made to the accompanying drawings, in which:

FIG. 2 is an axial cross-section of the control device taken along the line II—II of FIG. 3.

FIG. 3 is a side elevation view of the control device with parts broken away, taken along the line III—III of FIG. 2.

Figure 1:
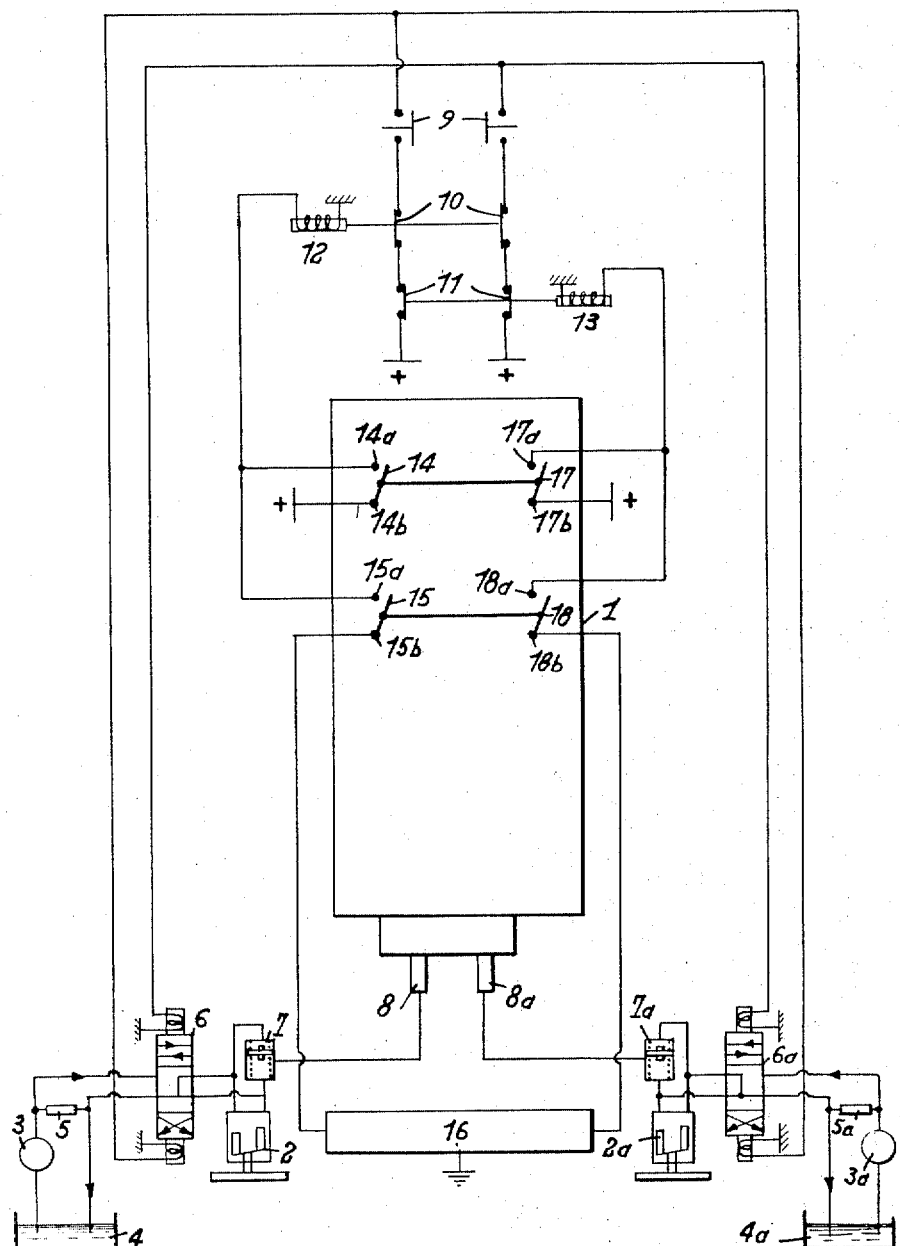
FIG. 1 is a diagram illustrating the method of use of the control device.

Referring first of all to FIG. 1, the control device is shown diagrammatically at 1, and it controls the torque of two hydraulic motors 2 and 2a, mounted in parallel on a single line shaft (not shown).

The supply apparatus of each of the motors is known per se and comprises a pump, 3 and 3a respectively, with return to the tank 4 and 4a, a by-pass 5 and 5a, and an electro-distributor 6 and 6a. At the input of each of the motors is provided a pressure regulator 7 and 7a, in communication with an input of the controller 1, respectively 8 and 8a.

The electrical control circuit of the electro-distributors 6 and 6a comprises a manual control, shown diagrammatically in the drawing by a double contact 9, and an electrical control actuated by the controller 1, as will be explained in more detail below, this electrical control comprising two double contacts 10 and 11 operated by relays, shown diagrammatically in the drawing as electro-magnets 12 and 13.

Each relay comprises two control circuits in parallel:

The relay 12 is connected on the one hand to the switch terminal 14a of a contactor 14 of the controller 1, and on the other hand to a switch terminal 15a of a second contactor 15 of the controller and to a device 16 for detecting the asymmetry of the motor torques, this detector device being connected to the second switch terminal 15b of the contactor 15.

Similarly, the relay 13 is connected on the one hand to the switch terminal 17a of a contactor 17 of the controller 1, and on the other hand to a switch terminal 18a of a contactor 18 and to the asymmetry detector 16, the latter being connected to the second switch terminal 18b of the contactor 18.

As shown in the drawing, the contactors 14 and 17 are rigidly coupled together for movement, that is to say they are operated simultaneously by the controller 1, as are also the contactors 15 and 18.

The controller 1 will now be described in detail with reference to FIGS. 2 and 3.

The control device comprises a casing 20, a base 19, in which are formed the two inlets 8 and 8a referred to above, and a base 21 through which pass the connection wires to the relays 12 and 13 and to the asymmetry detector 16. The inputs are respectively in communication with two annular bores 22a and 22b of a cylinder 22 housed in the base 19, and in which is a movable piston 23. This piston comprises two cylindrical portions of different sections, the front surfaces of which are respectively subjected to the action of the fluids in the bores 22a and 22b, so that the supply pressures of the hydraulic motors are applied conjointly on the piston 23. The piston surfaces on which these pressures act, namely the end face of the portion of small diameter and the annular surface which represents the resultant of the difference in diameters of the two parts of the piston, are preferably equal so that the piston is subjected to a thrust which is proportional to the sum of the applied pressures.

The end face of the larger diameter portion of the piston is in contact with the base of a cylinder 24 having a longitudinal section in the form of a U, the cylinder 24 being capable of sliding inside a cylinder 25 which is in turn movable inside the casing 20. The ends of the arms of the U of the cylinder 24 are provided with external annular shoulders which are separated by a space, when at rest, from an internal annular shoulder of the cylinder 25. In a similar manner, this latter cylinder comprises an external annular shoulder which is separated by a space, when at rest, from an internal shoulder of the casing 20, so that the relative movements of the cylinders 24 and 25, with respect to each other and with respect to the casing 20, are limited by the shoulders.

The base of the cylinder 24 is provided on its outer face with a cylindrical end-piece 26, inside which moves a piston 27, carrying on its outer face a push rod 28. A spring 29 arranged coaxially with the interior of the end piece 26 and the piston 27 pushes the latter towards the exterior. A spring 30 is also arranged outside the end piece 26 and coaxial therewith, and is compressed between the bottom of the cylinder 24 and a shoulder on a sleeve 31, which is threaded externally and threadably engaged in the cylinder 25.

In a similar manner, a spring 32 is arranged outside the cylinder 25 and coaxial therewith, and is compressed between the external shoulder of the said cylinder and an internal shoulder of a sleeve 33, which is externally threaded and threadably engaged in casing 20.

The push rod 28 is in contact with a stirrup 34 articulated on the frame of the casing 20 so as to be able to swing with respect to the casing. This stirrup itself carries two sets of push rods: on the one hand, two push rods 35 and 35a, housed in bores formed in the stirrup, in which they are able to slide and to the exterior of which they project under the action of springs 36 and 36a, the projection of the push rods outside their housings while at rest being adjustable by means of respective self-locking nuts, nut 37 being visible in FIG. 3; on the other hand, two push rods 38 and 38a, the position of which, fixed with respect to the stirrup, can be regulated by means of self-locking nuts, 39 and 39a respectively.

Facing the push rods 35 and 35a are arranged the two contactors 15 and 18 referred to above, which, in the case of the embodiment illustrated in FIGS. 2 and 3, are push rods of micro-switches 40 and 40a. Similarly, facing the push rods 38 and 38a are arranged the contactors 14 and 17, namely, in the present case, two micro-switch push rods 41 and 41a.

The micro-switches 40, 40a, 41 and 41a are respectively provided with the terminals 15a and 15b, 18a and 18b, 14a and 14b, 17a and 17b, mentioned above, which enable them to be connected by electric conductors to the relays 12 and 13 and to the asymmetry detector 16.

The arrangement of the push rods carried by the stirrup 34 with respect to the push rods of the micro-switches is such that during the course of the rocking movement of the stirrup, the push rods 15 and 18 are pushed down simultaneously first, and then the push rods 14 and 17 are simultaneously pushed down by an increased amplitude of the rocking motion.

A spring blade 42, compressed between the micro-switches and the stirrup, returns the latter to the position of rest when it is not actuated by the push rod 28.

The operation of the control device incorporated in a system such as that shown in FIG. 1 is as follows:

When the hydraulic motors 2 and 2a are supplied with pressure fluid, the piston 23 is acted upon by the sum of the supply pressures of these motors. When the force thus exerted on the piston exceeds the tension of the spring 30, the cylinder 24, pushed back by the piston, compresses the spring and operates the push rod 28 which rocks the stirrup. As the sum of the pressures rises, the push rods 35 and 35a progressively push the push rods 15 and 18 until the micro-switches 40 and 40a are closed. This takes place when the sum of the pressures reaches a predetermined threshold and, at this stage of the rocking movement of the stirrup, the symmetry detector 16 is thus connected respectively with the relays 12 and 13 and thereby can control their operation.

If the supply pressures of the motors continue to increase, the cylinder 24 comes into abutment by its external shoulder against the internal shoulder of the cylinder 25, and the latter moves in its turn, compressing the spring 32. The push rod 28 continues to act on the stirrup 34 which continues to pivot. This movement can continue in spite of the position in abutment of the push rods 15 and 18 of the micro-switches 40 and 40a, since the push rods 35 and 35a move into their respective housings in the stirrup, compressing their springs 36 and 36a respectively.

When the rocking movement of the stirrup 34 has progressed sufficiently, the push rods 38 and 38a begin to depress the push rods 14 and 17 of the micro-switches 41 and 41a. When this depressing movement corresponds to a sum of the pressures which is equal to a second predetermined value, contact is established at the interior of the micro-switches 41 and 41a, that is to say respectively between the terminals 14a and 14b, and between the terminals 17a and 17b, in the case of the system shown in FIG. 1, has the effect of deenergizing relays 12 and 13 thereby cutting off the supply to the motors and causing the pressures to fall.

During the course of tests made outside the normal utilization circuit, it may however happen that the pressures applied to the piston continue to increase. The cylinder 25 then continues to move until it comes into abutment against the shoulder of the casing. This movement does not result in any damage to the micro-switches 41 and 41a, since the push rod then moves into the interior of the cylinder 26 compressing the spring 29, the whole unit playing the part in this case of a torque limiter.

When the pressures fall, the same stages of operation are encountered in the reverse order, the contacts being opened at the moment when the sum of the pressures again becomes equal to values slightly less than the threshold values which, during the increase of pressure, corresponded to the closure of these contacts. The difference between these values is due on the one hand to the various friction forces between the moving members and the fixed members and on the other hand to the dead travel of the micro-switches between the position of their push rod at which the contact is established and that which corresponds to the opening of the contact.

The force controlling device may be preadjusted in the following manner, in order that the closure and the opening of the contacts of the various micro-switches may take place when the sum of the pressures applied on the piston reaches predetermined threshold values:

For the lowest threshold of pressure, that is to say for that which corresponds to the establishment of the contacts between the terminals 15a and 15b, and between the terminals 18a and 18b, action can first be taken on the threaded sleeve 31 by screwing it into the cylinder 25 in order to preadjust the compression of the spring 30. An accurate adjustment is then obtained by acting on the self-locking nuts which control the projection of the push rods 35 and 35a outside the stirrup 34, so as to regulate the closure of the contacts with precision.

For the higher threshold pressures corresponding to the closure of the contacts between the terminals 14a and 14b and between the terminals 17a and 17b, it is only necessary to act on the threaded sleeve 33 by screwing it into the casing in order to adjust the compression of the spring 32; the adjustment is completed by varying the projection of the push rods 38 and 38a outside the stirrup 34, by means of the self-locking nuts 39 and 39a.

The form of construction of the control device which has just been described is only intended to illustrate the invention and other forms of construction can obviously be conceived without departing from its scope.

It is also clear that the control device according to the invention can control the supply of hydraulic motors as a function of the torques which they apply, by means of electric systems other than that illustrated in FIG. 1.

What I claim is:

1. A control device adapted for controlling the supply of fluid from two hydraulic supply circuits to two respective hydraulic pressure devices which are adapted for being connected in parallel to a common receiver, said control device comprising a first system of two electrical contactors, a second system of two electrical contactors, pressure-sensitive means connected to the hydraulic supply circuits of the said hydraulic pressure devices for actuating the first said system with the sum of the supply pressures of said circuits at a first predetermined value and to actuate the second said system with the sum of the supply pressure of said circuits at a second predetermined value greater than the said first value, said contractor systems including means for returning said contactors to initial positions thereof when no longer actuated by said pressure-sensitive means.

2. A device as claimed in claim 1 wherein the hydraulic pressure devices are motors and the device is adapted for controlling the torque exerted by the motors to a common shaft, said device comprising means for sensing asymmetry in the torques of the motors, each hydraulic supply circuit having an electrodistributor therein, a pair of relays controlling activation of respective electrodistributors, the two contactors of said first system being connected to respective relays for selectively activating the same, the contactors of said second system connecting the relays and the means which senses asymmetry in the torques of the motors.

3. A control device adapted for controlling the supply of fluid from two hydraulic supply circuits to two respective hydraulic pressure devices which are adapted for being connected in parallel to the same receiver, said control device comprising a housing having two inlets for connection to respective supply circuits of said devices, a cylindrical chamber in said housing, two hydraulic circuits in the housing respectively connecting the two inlets to said cylindrical chamber, a piston slidably mounted in said cylindrical chamber, said cylindrical chamber having openings in communication with said supply circuits and said piston having a shape related to said openings such that said piston is subjected to the sum of the hydraulic pressures prevailing in said circuits, a first movable cylinder in said housing, resilient means acting on said first movable cylinder, the latter cylinder being coaxial with said piston and arranged to move in response to movement of said piston in opposition to said resilient means, a second movable cylinder in said housing, second resilient means acting on said second cylinder, the latter cylinder being coaxial with said first cylinder and arranged to be driven by said first cylinder in opposition to said second resilient means, a pusher member driven by said piston, a stirrup pivotally mounted in said housing and provided with return means, said stirrup being engageable by said pusher member, a first and second system of two push rods each on said stirrup, a first system of two electrical contactors and a second system of two electrical contactors having control elements arranged respectively in opposed relationship to said first and second systems of push rods on said stirrup, said first and second push rods being arranged on said stirrup to cause the first and second systems of two electrical contactors to be actuated at different times by said stirrup upon pivotal movement thereof.

4. A device as claimed in claim 3 comprising a sleeve secured to said first cylinder and accommodating said pusher member for sliding movement in said sleeve, and a spring between said first cylinder and said pusher member.

5. A device as claimed in claim 3 wherein the first resilient means comprises a sleeve secured to the second cylinder and a spring interposed between the first cylinder and the sleeve, said sleeve and second cylinder having a threaded connection thereby to permit adjustment of the tension of the spring.

6. A device as claimed in claim 3 wherein the second resilient means comprises a sleeve secured to the housing and a spring interposed between the second cylinder and the sleeve, said sleeve and the housing having a threaded connection thereby to permit adjustment of the tension of the spring.

7. A device as claimed in claim 3 wherein the push rods of said first system of push rods are positioned in bores provided in the stirrup, springs being provided acting between said push rods of said first system and said stirrup, said push rods of said first system being movable in said bores in opposition to said springs.

8. A device as claimed in claim 3 comprising self-locking nuts adjustably securing the push rods of the second system to the stirrup.

References Cited

UNITED STATES PATENTS

| | | | |
|---|---|---|---|
| 2,331,108 | 10/1943 | Ganahl | 91—358 |
| 2,358,269 | 9/1944 | Wemhaner | 91—433 |
| 3,196,756 | 7/1965 | Bolton et al. | 91—1 |

FOREIGN PATENTS 523,600   7/1940   Great Britain.

MARTIN P. SCHWADRON, *Primary Examiner.*

P. E. MASLOUSKY, *Assistant Examiner.*